US011138696B2

(12) United States Patent
Verret

(10) Patent No.: US 11,138,696 B2
(45) Date of Patent: Oct. 5, 2021

(54) GEOLOCATION IMPROVEMENT OF IMAGE RATIONAL FUNCTIONS VIA A FIT RESIDUAL CORRECTION

(71) Applicant: Raytheon Company, Waltham, MA (US)

(72) Inventor: Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 48 days.

(21) Appl. No.: 16/586,349

(22) Filed: Sep. 27, 2019

(65) Prior Publication Data

US 2021/0097652 A1 Apr. 1, 2021

(51) Int. Cl.
*G06T 5/00* (2006.01)

(52) U.S. Cl.
CPC .............. *G06T 5/003* (2013.01); *G06T 5/006* (2013.01); *G06T 2207/10032* (2013.01); *G06T 2207/20201* (2013.01)

(58) Field of Classification Search
CPC ............... G06T 5/003; G06T 5/006; G06T 2207/20201; G06T 2207/10032
USPC .......................................................... 382/275
See application file for complete search history.

(56) References Cited

U.S. PATENT DOCUMENTS

| 7,310,440 | B1 * | 12/2007 | Dolloff | G06K 9/0063 345/427 |
| 9,794,483 | B1 * | 10/2017 | Robinson | G06T 7/251 |
| 10,553,020 | B1 * | 2/2020 | Mainline | G06T 15/60 |
| 2003/0044085 | A1 * | 3/2003 | Dial, Jr. | G01C 11/02 382/293 |
| 2004/0122633 | A1 * | 6/2004 | Bang | G01C 11/00 703/2 |
| 2005/0147324 | A1 * | 7/2005 | Kwoh | G01C 11/00 382/293 |
| 2010/0284629 | A1 * | 11/2010 | Xiong | G06T 7/80 382/276 |
| 2012/0263373 | A1 * | 10/2012 | Walter | G06T 7/593 382/154 |
| 2014/0191894 | A1 * | 7/2014 | Chen | G01S 13/867 342/52 |

(Continued)

OTHER PUBLICATIONS

"NITFS Technical Board Public Page", NTB, [Online], Retrieved from the Internet: <URL: https://www.gwg.nga.mil/ntb/index.html>, (2021), 1 pg.

(Continued)

*Primary Examiner* — Ali Bayat
(74) *Attorney, Agent, or Firm* — Schwegman Lundberg & Woessner, P.A.

(57) ABSTRACT

A process improves accuracy in mapping geodetic coordinates to image sensor coordinates via an image rational function. The image rational function is fitted to an image-to-ground sensor model at an input grid of image u coordinates and image v coordinates, and further at geodetic longitudes, geodetic latitudes, and geodetic heights corresponding to the image u coordinates and the image v coordinates. This fitting generates fit residuals. The fit residuals are stored as a function of the image u coordinates, the image v coordinates, and the geodetic height coordinates. The fit residuals are applied to metadata associated with the image rational function. This application corrects for a residual error in a fit of the image rational function to the image-to-ground sensor model.

20 Claims, 7 Drawing Sheets

(56) References Cited

U.S. PATENT DOCUMENTS

2016/0259044 A1* 9/2016 Chen .................. G01S 13/867
2018/0053329 A1* 2/2018 Roberts ................ G06T 19/00

OTHER PUBLICATIONS

Dolloff, John, et al., "Replacement Sensor Model Tagged Record Extensions Specification for NITF 2.1", BAE Systems—RSM TRE Descriptions, (Jul. 23, 2004), 122 pgs.

Dolloff, John, et al., "The Replacement Sensor Model (RSM): Overview, Status and Performance Summary", ASPRS 2008 Annual Conference, (2008), 10 pgs.

Iiyama, Michelle, et al., "The ABC's of RSM: An introduction to the Replacement Sensor Model", BAE Systems, (Sep. 30, 2006), 43 pgs.

Taylor, C, et al., "Replacement Sensor Model (RSM) Performance for Triangulation and Geopositioning", Proceedings, ASPRS, (2008), 11 pgs.

* cited by examiner

GEOLOCATION IMPROVEMENT OF IMAGE RATIONAL FUNCTIONS VIA A FIT RESIDUAL CORRECTION

TECHNICAL FIELD

The present disclosure generally relates to image rational functions, and in an embodiment, but not by way of limitation, an improvement of image rational functions via a fit residual correction.

BACKGROUND

Rational functions (RF) are well known as a math model "replacement" for a complicated original sensor model. Such rational functions can be expressed as a ratio of tri-variate polynomials. In practice, an original sensor model uses support data (e.g., sensor position and pointing, optical focal length, etc.) to rigorously map image coordinates to ground coordinates. Both rational functions and sensor models map ground coordinates (longitude, latitude, and elevation) to image coordinates (line, sample). The Replacement Sensor Model (RSM) is a generalization of rational functions and is a National Geospatial-Intelligence Agency (NGA) standard and specification.

However, rational functions in general suffer accuracy issues due to physical phenomena that they cannot model from the original sensor model. One such example is oscillatory motion due to vehicle wobble (commercial satellites) or atmospheric buffeting (airborne sensors). A problem stems from the fact that oscillatory motion is periodic, whereas the polynomials that make up rational functions are smooth. In situations where a true replacement for a complicated original sensor model is needed, rational functions may be inaccurate due to high fit residuals.

Some have tried to address this problem by sectioning the RSM into multiple sets of rational functions, but a sectioned RSM can produce significant discontinuities in the mapping. Others have attempted to take advantage of the fact that the RSM standard provides a grid correction to reduce residual fit error. However, the RSM grid is inefficient at reducing residual error. The RSM grid is formed on the ground and is not naturally conducive to accommodating the fit residuals, which exist in image space. In addition, a rather dense and complex grid would need to be formed on the ground to accommodate oblique or wide field of view (WFOV) images.

What is needed for accurate mapping applications is a system wherein the rational function replacement accurately and simply models the original sensor to the subpixel level.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
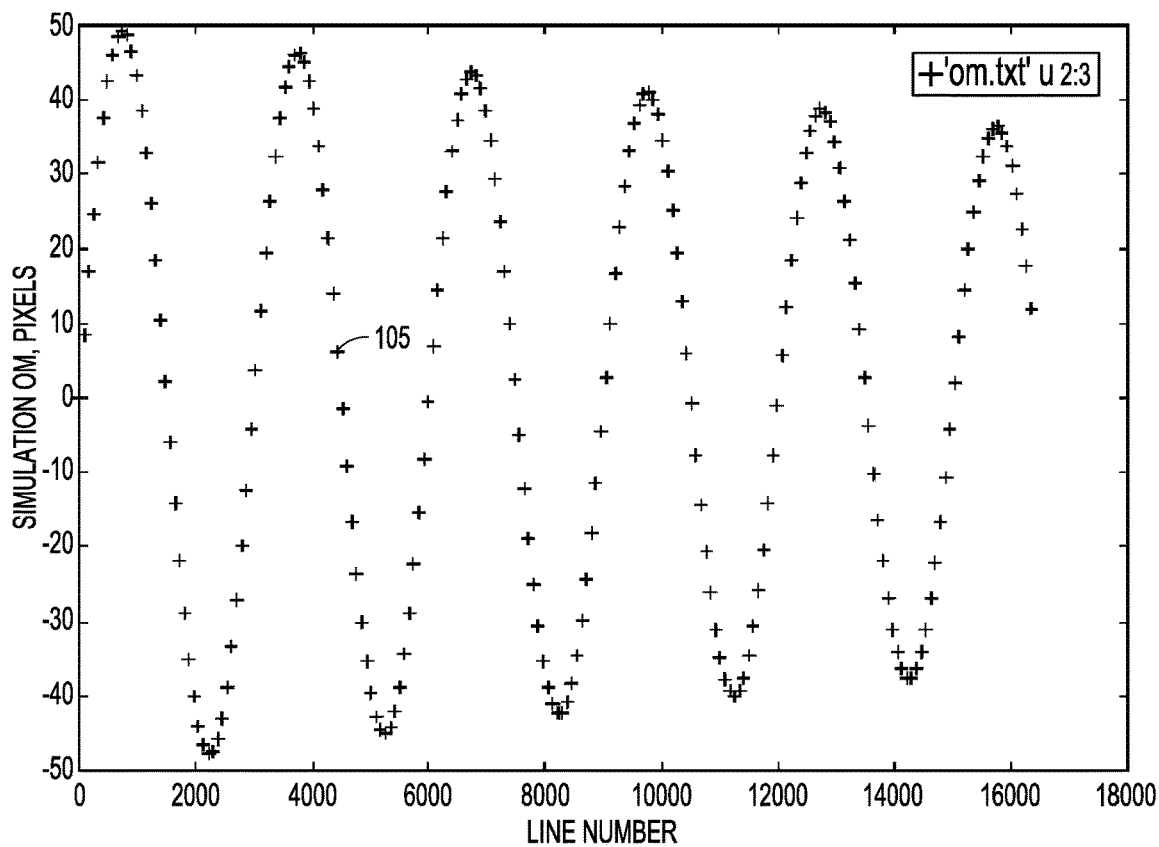
FIG. 1 is a diagram illustrating a simulation of the oscillatory motion of an imaging satellite.

Rational functions for geometric sensor modeling are a ratio of three-variable polynomials that map a point in the three-dimensional (3D) space on the ground, (e.g., latitude, longitude, and height) to a corresponding 2D point in image space (e.g., image u and v coordinates.) Rational functions can also be used to project down to the ground and do a ray intersection and determine ground coordinates of an associated image coordinate. The rational function can further serve as a replacement for a complicated original sensor model. While the original sensor model can use its data to map down to the ground, the model and data are complicated and expensive to calculate. Consequently, rational functions serve as a replacement for the complicated sensor model.

However, the rational functions, being an approximation to the original sensor models, suffer accuracy issues. For example, in a commercial satellite case, the satellite images are scanned, taken as a function of time. Consequently, if the satellite is vibrating or wiggling, these oscillatory motions affect the image. In the worst case, the oscillatory motions actually show up in the image, such that the image is wavy. While in general this waviness cannot actually be seen in the satellite image, the waviness is still there in the support data and that affects the absolute accuracy of the geolocation determination.

A fundamental problem of rational functions is that a polynomial cannot fit such oscillatory motion. Since the rational function is an approximation, the rational function geolocation is going to suffer inaccuracy. When one tries to fit the rational function to the oscillatory motion data, the result is that there are significant fit residuals, which are the delta between the smooth rational function and the original sensor model. The replacement sensor model (RSM) has an approach to correct this by sectioning, that is, by breaking up the image into different rational functions and then concatenating them together. The RSM also has a grid correction wherein a grid of points is established, and then the grid is interpolated in three-dimensional (3D) space, providing a corresponding image u and v coordinate correction for phenomena such as oscillatory motion. However, with the RSM, the grid correction is laid out in ground space, but within the fit process for the rational functions, the grid is more naturally formed in image space. Consequently, the RSM standard is not easily conducive to accommodating the fit residuals because its grid is not formed in the natural space of the fit (it is laid out in ground space as opposed to image space.) And in order to do a correction based on a ground space grid, a very dense grid would have to be used to accommodate oblique images such as images from an airborne sensor looking toward the horizon. Lastly, for very accurate mapping applications where geolocation accuracy is paramount, the rational function replacement needs to accurately model the original sensor to the sub-pixel level.

An embodiment addresses these issues. The residual correction of a disclosed embodiment can model the original sensor accuracy (up to interpolation error). This is accomplished by constructing the fit residual correction grid in image space, which makes the fit residual grid construction directly derivable from the fit. Additionally, this embodiment of a residual correction approach works with a single rational function, thereby eliminating sectioning discontinuity problems. Also, the residual correction approach herein has the potential for using a numerator-only polynomial, thus eliminating risk of division by zero (singularities), and the smaller number of terms in the rational function or polynomial result in faster evaluation of the model.

In prior systems, there is the original sensor model and the rational function model. In an embodiment, a new model is the rational function model plus a correction. The correction is the residual, which is the difference between the rational function model and the original sensor model. The residuals are available as a by product of the fitting process. They can thus be readily measured, and further can be stored as an auxiliary set of data that is applied to the rational function to correct for the error in the fit. The Replacement Sensor Model (RSM) correction has a grid correction. What differentiates this embodiment from what is currently in the RSM specification is that the correction is formed as a function of a regular grid in image space, versus a regular grid in ground space. That is, storing the data and applying the data in image space provides a correction directly related to the residual (the space is which the residuals reside).

Figure 2:
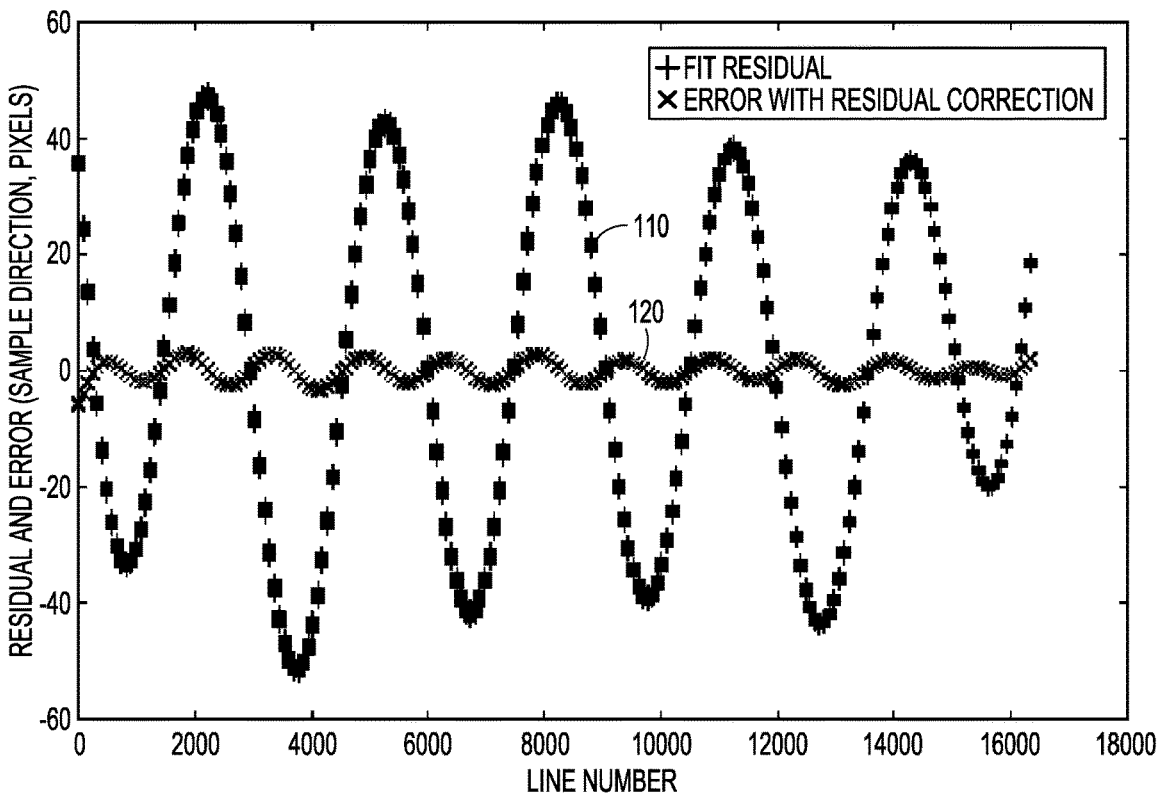
FIG. 2 is a diagram illustrating ordinary rational function fit residuals and associated error in a residual correction approach.

Referring to FIGS. 1 and 2, a simulation of oscillatory motion is illustrated on the order of several pixels. The x-axis is associated with time, that is, the satellite is scanning as a function of time. The oscillations are simulating the satellite wiggling back and forth as a function of time. Solving for a rational function with data that include such oscillations results in significant fit residuals, as illustrated in FIG. 2. In FIG. 2, the boxes 110 are the residuals of the fit, that is, the delta between the original model and the rational function approximation.

More specifically, FIGS. 1 and 2 illustrate the improved effect of an embodiment. FIG. 1 illustrates the oscillatory motion of an imaging satellite with data points 105. FIG. 2 illustrates the ordinary fit residuals associated with this oscillatory motion. These ordinary fit residuals are represented by the boxes 110 in FIG. 2. Application of an embodiment with correction of the rational function fit residuals is illustrated in FIG. 2 by the reduced amplitude of the line 120. More specifically, in FIG. 2, without the correction, the error in the fit of the pixels is in the tens of pixels (up to 40 pixels in FIG. 2). As illustrated in FIG. 2, this error approaches zero pixels with the correction of an embodiment.

An embodiment accomplishes the results of FIG. 2 as follows. Since the residuals are known at the time of the fit, they can be captured and applied to the original rational functions during the invocation of downstream algorithms. This can be referred to as exploitation. This exploitation results in a corrected rational function that matches the original sensor model. The downstream algorithms can thus work as is with only a simple modification. Such modification is to evaluate the rational function and apply a simple residual correction to the mapping. Downstream algorithms include image orthorectification, multi-ray intersection, stereo rectification, 3D model extraction, and other related algorithms. The residual correction (regardless of how large) can be used to solve for a single rational function, thus eliminating the RSM problem of section discontinuities.

Referring again to FIG. 1, the sine-like wave shows simulated periodic motion of the satellite (the motion as it oscillates or vibrates in its space during image collection). With these data showing the oscillatory motion of the satellite, one attempts to fit a rational function to it. But there is an error between the solved rational function and the motion in the original sensor model. This error is what is referred to as the residual when a fit is performed. The residuals are illustrated at 110 in FIG. 2. The blocks 110 are the residuals, and the residuals are typically characterized in the image space as units of pixels. On the y-axis in FIG. 2, the residual error associated with the fit is illustrated and is on the order of 45 pixels peak error. So as illustrated in FIG. 2, the rational function does not remove the oscillatory motion. The fit residuals are on the order of magnitude of the oscillatory motion (about 45 pixels in FIG. 2). However, for precise mapping applications (such as the downstream algorithms previously mentioned), 45 pixels is grossly unacceptable.

To address this, in an embodiment, the residuals (FIG. 2, No. 110) are available and can be measured. An embodiment therefore just stores the residuals as an auxiliary set of data that are then applied to the rational function to correct for the error. Taking the original polynomial and then building a grid of corrections, which are the boxes 110 in FIG. 2. The line 120 in FIG. 2 represents the solution with the residual 110 accommodated. Since the residuals 110 are a sampling of what the error is, the error is then obtained by performing a linear interpolation between locations of the residuals.

The grid that is formed for doing the RF fit is in the line direction (the image u direction) as well as the sample direction (the image v direction) and at several height planes in ground space. The grid that's actually formed is thus a function of a line number, a sample number, and a height. The correction grid consists of a three dimensional grid point that has a correction for the sample direction and a correction for the line direction. It is a three-dimensional to two-dimensional mapping. Just like the rational function, it maps three dimensions to two dimensions, but the correction is an additional portion added to the output of the rational function.

For general rational functions, there is a polynomial in the denominator. The denominator typically reduces the fit residuals; however, the denominator provides a potential of crossing zero when solving the rational function. An embodiment by contrast does not have this shortcoming, since an embodiment can model the rational function as a numerator-only polynomial. The risk of division by zero is therefore eliminated. In short, the denominator is not a concern in this embodiment because the residual correction can accommodate what the denominator models.

In an embodiment, the order of the number of terms in the polynomial can be reduced, which would result in faster evaluation for the model because there are less terms to evaluate. The residual correction is essentially a fast look up as a correction.

The details of a method to improve the accuracy of rational function approximations, which map geospatial coordinates to an imaging sensor's image coordinates, are as follows. As previously noted, rational functions (RFs—in the form of a ratio of 3D polynomials) are a classical way of providing a mathematical approximation to an original sensor's mapping of geospatial or ground coordinates to imaging pixels coordinates.

A generalized rational function solver uses an original (a.k.a. "rigorous") sensor model grid as input for its solution. The grid is constructed by laying out a regular (i.e., evenly-spaced) lattice in sample and line space and projecting to geodetic coordinates (longitude and latitude) at several evenly-spaced heights on the ground ("z planes"). The result is a set of quintuples: (s,l,x,y,z), where x,y,z denote (respectively) geodetic longitude, latitude and height above ellipsoid (HAE). In some notations, sample and line (s,l) are replaced by the more general terms (u,v).

The resulting quintuples are inputs to the rational function solver. The solver is a least squares fitting process, and the rational function mapping is an approximation of the original sensor model up to the fit residuals. Thus, prevalent problems with the accuracy in the rational function fit are cases in which the residuals are significant. Here "accuracy" refers to the degree to which the rational function approximates the original sensor model geometry mapping.

General geolocation problems may be tolerant of relatively high residuals (e.g., several pixels). However, high-accuracy mapping applications may suffer. For mapping applications (e.g., image orthorectification), it is desirable for the rational function to model the original sensor model to the subpixel level (peak residual). Therefore, an embodiment provides an approach akin to the RSM grid concept, but extended to provide a residual correction that is more naturally mapped to the fit space. This embodiment can be denoted "RF residual correction".

If an input (u,v,x,y,z) grid for the solver is constructed that is dense enough, the embodiment employs augmenting the rational function metadata (i.e. solved polynomial coefficients) with a correction. The correction involves applying the residuals of the fit to the resulting output (range) coordinates (u,v) obtained from evaluation of the rational function at a particular input (domain) point (x,y,z). Thus, at a particular (x,y,z) grid point, the evaluated rational function plus the residual matches the original sensor model more closely than the rational function alone.

To provide a correction at an arbitrary (x,y,z) point, a tri-linear interpolation of the fit residuals is employed. The combination of the evaluation of the rational function and the interpolation of residuals thus makes the mapping consistently accurate with the original sensor model (up to interpolation error).

The following paragraphs formalize the embodiment and metadata conventions. Since the embodiment itself involves construction of a grid for interpolation, there are multiple types of grids discussed. The first is the grid constructed for the rational function solver (i.e. the aforementioned quintuples (u,v,x,y,z) generated from the original sensor model). The second is the grid constructed for the residual correction. The first can be referred to as an "RF fit grid" and the second can be referred to as a "residual correction grid".

The following paragraphs further provide formulations and notational conventions established to develop the correction method, and error models for the correction method. The following paragraphs also provide for analysis of the errors implicit in the correction method, simulation results, development of analytical forms of the interpolation and Jacobian and generalized Newton-Raphson root solving.

In an embodiment, P: $R^3 \rightarrow R^2$ represents the rational function. The function P thus has a 3D domain (x,y,z) (i.e. geospatial ground coordinates) and a 2D range (u,v) (i.e. sensor imaging coordinates). The function P is a pair of rational function: one mapping (x,y,z) to output point u and similarly for v.

For notational development of the error in the rational function, the original sensor model function, S: $R^3 \rightarrow R^2$ is introduced. The function S has the same 3D domain and the same 2D range as P; however, for this application S is assumed to be error free—i.e. the "truth" function is the original sensor model. The original sensor model S is used to generate the rational function fit grid.

The mapping from ground to image via the original sensor model is written $$\begin{bmatrix} u \\ v \end{bmatrix} = S\left(\begin{bmatrix} x \\ y \\ z \end{bmatrix}\right) \quad (1)$$

The rational function mapping provides an approximation (û, v̂) of original sensor image coordinates (u,v) for an arbitrary ground domain point:

$$\begin{bmatrix} \hat{u} \\ \hat{v} \end{bmatrix} = P\left(\begin{bmatrix} x \\ y \\ z \end{bmatrix}\right) \quad (2)$$

The error between the original sensor model and the rational function evaluated point is denoted as $$\begin{bmatrix} \varepsilon_u \\ \varepsilon_v \end{bmatrix} = \begin{bmatrix} u \\ v \end{bmatrix} - \begin{bmatrix} \hat{u} \\ \hat{v} \end{bmatrix} \quad (3)$$

The error in P (i.e., "RF-error") at an arbitrary ground point is thus $$\underset{2 \times 1}{\varepsilon} = \begin{bmatrix} \varepsilon_u \\ \varepsilon_v \end{bmatrix} = S\left(\begin{bmatrix} x \\ y \\ z \end{bmatrix}\right) - P\left(\begin{bmatrix} x \\ y \\ z \end{bmatrix}\right) \quad (4)$$

If the number of points in the RF fit grid is N, then the RF fit grid then consists of quintuples $$(u,v,x,y,z)_i, i \in \{1, \ldots, N\} \quad (5)$$

The fit residuals for each RF fit grid point are simply the error between the original sensor model and the rational function evaluation, namely $$\underset{2 \times 1}{\varepsilon_i} = \begin{bmatrix} \varepsilon_u \\ \varepsilon_v \end{bmatrix}_i = \begin{bmatrix} u \\ v \end{bmatrix}_i - P\left(\begin{bmatrix} x \\ y \\ z \end{bmatrix}_i\right) \quad (6)$$

Equation (6), is then a special form of the general RF-error in equation (4). Namely, it is the residual of the fit at grid point i, and is computed as the (original sensor model) point [u v]$_i$ minus the evaluation of the rational function at domain point [x y z]$_i$.

For an error analysis, trilinear interpolation of the fit residuals is accomplished by storing the fit residuals from the RF-fit grid as a function of original sensor model coordinates (u,v,z). The interpolation domain is thus the original sensor model coordinates (u,v,z) and the range is the residual correction of the error in the rational function at each RF-fit grid point, namely ($\varepsilon_u$, $\varepsilon_v$) from equation (6). Since the interpolation itself is an approximation to the error in equation (4), it has its own contributing error. This error is denoted as $$\underset{2\times 1}{\delta} \equiv \begin{bmatrix} \delta_u \\ \delta_v \end{bmatrix} \quad (7)$$

Error models are now developed encompassing rational function error and the interpolation error. An estimate $\hat{\varepsilon}$ of the true error $\varepsilon$ in equation (4) is obtained as $$\hat{\varepsilon} = \begin{bmatrix} \hat{\varepsilon}_u \\ \hat{\varepsilon}_v \end{bmatrix} = L(u, v, z) \quad (8)$$

where the function $L:R^3 \rightarrow R^2$ is a tri-linear approximation of the true error as a function of (u,v,z). Combining equations (4) and (8), the interpolation error is then $$\underset{2\times 1}{\delta} = \varepsilon - \hat{\varepsilon} = S\left(\begin{bmatrix} x \\ y \\ z \end{bmatrix}\right) - P\left(\begin{bmatrix} x \\ y \\ z \end{bmatrix}\right) - L(u, v, z) \quad (9)$$

The equation relating arbitrary ground coordinates (x,y,z) to true image coordinates (u,v) is given as $$\underset{2\times 1}{i} \equiv \begin{bmatrix} u \\ v \end{bmatrix} = S\left(\begin{bmatrix} x \\ y \\ z \end{bmatrix}\right) \quad (10)$$

Substituting equation (10) into (9) gives $$i = P\left(\begin{bmatrix} x \\ y \\ z \end{bmatrix}\right) + L\left(\begin{bmatrix} u \\ v \end{bmatrix}; z\right) + \delta$$

$$= P\left(\begin{bmatrix} x \\ y \\ z \end{bmatrix}\right) + L(i; z) + \delta \quad (11)$$

It is tempting to provide (as a replacement to (11)) the following equation $$i = P\left(\begin{bmatrix} x \\ y \\ z \end{bmatrix}\right) + L\left(P\left(\begin{bmatrix} x \\ y \\ z \end{bmatrix}\right); z\right) + \delta \quad (12)$$

However, equation (12) is incorrect since the domain of L includes the original sensor image coordinates $[u\ v]^T$, not the approximation of them provided by P. As a result, equation (11) must be solved for the true sensor image coordinates, i. It is desirable to solve equation (11) for i, up to the error in interpolation, $\delta$. This can be cast as a root finding problem by subtracting i from both sides of equation (11) resulting in $$P\left(\begin{bmatrix} x \\ y \\ z \end{bmatrix}\right) + L(i; z) - i = -\delta \approx 0 \quad (13)$$

F (i) is now defined as the left side of equation (13) as $$\begin{bmatrix} f_u(i) \\ f_v(i) \end{bmatrix}_{2\times 1} = F(i) = P\left(\begin{bmatrix} x \\ y \\ z \end{bmatrix}\right) + L(i; z) - i = -\delta \quad (14)$$

It is desirable to find the root i of equation (14) under the assumption that the interpolation error $\delta$ is approximately zero and thus is negligible. Equation (14) thus simply becomes $$F(i) = P\left(\begin{bmatrix} x \\ y \\ z \end{bmatrix}\right) + L(i; z) - i = 0 \quad (15)$$

The multi-dimensional Newton-Raphson iteration formula associated with equation (15) is $$i \leftarrow i + \delta i = i - J^{-1}(i)F(i) \quad (16)$$

with the Jacobian $$J = \begin{bmatrix} \frac{\partial f_u}{\partial u} & \frac{\partial f_u}{\partial v} \\ \frac{\partial f_v}{\partial u} & \frac{\partial f_v}{\partial v} \end{bmatrix} \quad (17)$$

The Jacobian in equation (17) may be computed by numerically differentiating equation (15). It is noted that the first term in equation (15) (i.e. evaluation of the rational function at the fixed point (x,y,z)) is constant with respect to i. Thus, its partial derivative with respect to i is zero. Differentiating equation (15) then gives the following numerical differentials of the entries of J:

$$\frac{\partial f_u}{\partial u} = \frac{\partial L_u}{\partial u} - \frac{\partial i_u}{\partial u} \approx \frac{L_u(u + \Delta u, v, z) - L_u(u, v, z)}{\Delta u} - 1 \quad (18)$$

$$\frac{\partial f_u}{\partial v} = \frac{\partial L_u}{\partial v} - \frac{\partial i_u}{\partial v} \approx \frac{L_u(u + \Delta u, v, z) - L_u(u, v, z)}{\Delta v} - 0 \quad (19)$$

$$\frac{\partial f_v}{\partial u} = \frac{\partial L_v}{\partial u} - \frac{\partial i_v}{\partial u} \approx \frac{L_v(u, v + \Delta v, z) - L_v(u, v, z)}{\Delta u} - 0 \quad (20)$$

$$\frac{\partial f_v}{\partial v} = \frac{\partial L_v}{\partial v} - \frac{\partial i_v}{\partial v} \approx \frac{L_v(u, v + \Delta v, z) - L_v(u, v, z)}{\Delta v} - 1 \quad (21)$$

where $\Delta u$ and $\Delta v$ are small numerical perturbations of U and V (e.g., $\Delta u = \Delta v = 0.01$ pixels).

Regarding the error in the method at RF fit grid points, the effectiveness of the method can be illustrated as follows. The error in the method should be very near to zero at the RF fit grid points (up to the convergence tolerance of the Newton-Raphson iteration). To show this, consider an arbitrary RF fit grid point, $(u, v, x, y, z)_i$. The original sensor formulation at the grid point is $$i_i = \begin{bmatrix} u_i \\ v_i \end{bmatrix} = S\left(\begin{bmatrix} x_i \\ y_i \\ z_i \end{bmatrix}\right) \quad (22)$$

Now, the interpolation error at an exact RF fit grid point is zero. Thus $$\delta_{2\times 1} = 0_{2\times 1}$$

and the function L will exactly represent the residual of the fit, i.e.

$$\varepsilon_i = \hat{\varepsilon}_i L(u_i, v_i, z_i) \quad (23)$$

Substituting $\delta=0$ into equation (9) gives $$S\left(\begin{bmatrix} x_i \\ y_i \\ z_i \end{bmatrix}\right) - P\left(\begin{bmatrix} x_i \\ y_i \\ z_i \end{bmatrix}\right) - L(i_i; z_i) = 0 \quad (24)$$

Using the Newton-Raphson (NR) iteration to solve for $i_i$, equation (24) becomes $$S\left(\begin{bmatrix} x_i \\ y_i \\ z_i \end{bmatrix}\right) = P\left(\begin{bmatrix} x_i \\ y_i \\ z_i \end{bmatrix}\right) + L(i_i; z) \quad (30)$$

Equation (25) demonstrates that the correction approach exactly models the original sensor projection at a RF fit grid point location (up to the convergence tolerance of the NR-method).

Based on the above formulations, for an arbitrary ground point (x,y,z), i can be iteratively solved for via Newton-Raphson root approximation as follows.

$$i^{(0)} = P\left(\begin{bmatrix} x \\ y \\ z \end{bmatrix}\right).$$

1. Form an initial approximation to i as Note that this is a very good approximation of i, since it is within the error between the original sensor model and that obtained by P. Thus (via equation (3)) $i-i^{(0)}=\varepsilon$.
2. Set the iteration index p=0.
3. Form the numerical Jacobian via formulations in equations (18) through (21) at $i^{(p)}$. Alternatively J can be computed analytically via equations developed in further formulations herein.
4. Evaluate F at $i^{(p)}$.
5. Solve for $\delta i^{(p)}$ as $$\delta i^{(p)} = -J^{-1}(i^{(p)})F(i^{(p)}) \quad (26)$$

where the Jacobian and F are each evaluated at $i^{(p)}$
6. Solve for $i^{(p+1)} = i^{(p)} + \delta i^{(p)}$.
7. Compute the discrepancy for iteration (p) as $y = i^{(p+1)} - i^{(p)}$.
8. Compare the norm of the discrepancy against a prescribed small positive convergence tolerance, $\beta \in R^1$. That is compute $\|y\|$ and compare to $\beta$. If $\|y\|<\beta$, the final solution is $i^{(p+1)}$. Otherwise increment iteration index (p←p+1) and current solution value ($i^{(p)} \leftarrow i^{(p+1)}$) and go to step 2.

To illustrate the effectiveness of the residual correction method, oscillatory motion can be simulated as follows.

1. Obtain an original rational function from a commercial imaging satellite (rational functions for commercial imaging satellites are also known as Rational Polynomial Coefficients—i.e. RPCs). The original rational function emulates an "ideal" model (i.e. it is a simple replacement for an ideal original sensor model that does not exhibit oscillatory motion).
2. Write a simulator to introduce artificial oscillatory motion (OM) to the original RPCs.
3. Generate a "truth" RF fit grid of 40×200×5 (numSamps×numLines×numZ) based on the original RPCs plus the simulated OM. This grid thus emulates that collected from a "true" sensor with appreciable OM.
4. Perform an RF fit on the simulated-OM RF fit grid ("quintuples"). The rational function will thus model the true sensor (with simulated OM) up to the fit residuals.
5. Capture the RF fit residuals in the form of the residual correction grid.
6. Generate a denser grid (80×400×10) with OM for evaluation of the error in the residual correction method (most notably, the interpolation error $\delta$).
7. Compute the error in the residual correction method by projecting the fit grid and comparing to original sample and line coordinates.
8. Compute the error in the tri-linear interpolation by projecting the dense grid and comparing original sample and line coordinates.

FIGS. 1-9 show the effectiveness of the correction method. Note that there is error in both directions (i.e. a sample error and a line error). However, only the errors in the sample direction are illustrated (plots for error in the line direction are similar). FIG. 1 illustrates the simulated oscillatory motion (OM) profile. Note in FIG. 1 that a grossly exaggerated OM profile (50 pixels) is illustrated. The simulated OM of this magnitude is not typical of a satellite platform. However the simulated OM is grossly exaggerated to illustrate the effectiveness of the method, even in the presence of large fit residuals.

The residual correction method is evaluated both with and without the Newton-Raphson iteration previously discussed. This mainly shows that for large RF fit residuals, the NR-iteration is a critical step. Truth points can be evaluated at both the RF fit grid and at a denser version of the RF fit grid. The latter is mainly to show errors in the trilinear interpolation.

Figure 3:
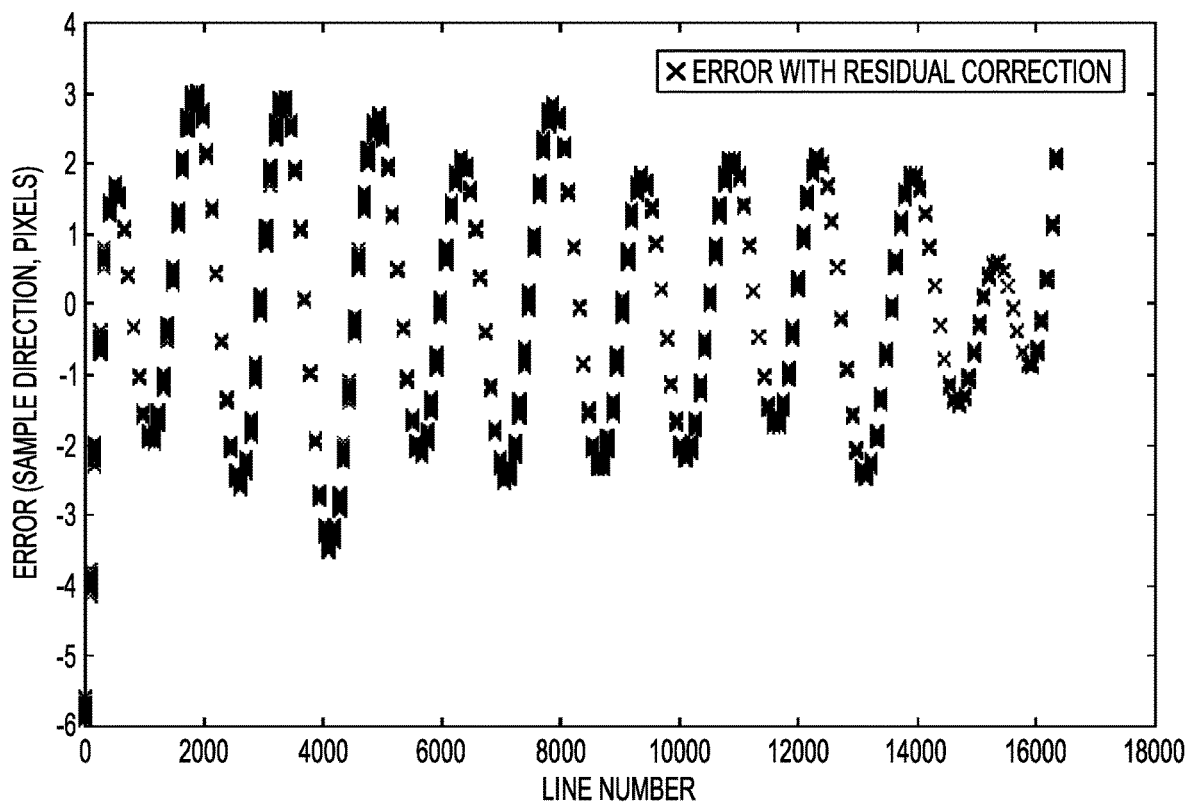
FIG. 3 is a diagram illustrating a zoom on the error shown in FIG. 2.

FIG. 2 shows fit residuals and application of the residual correction at the RF fit grid, but without the use of NR iteration. FIG. 3 shows a zoom on the error shown in FIG. 2. It is noted that since the original fit residuals are appreciable, the error in the method without NR iteration is still several pixels. It is a significant reduction in the residuals, but it is not "perfect".

Figure 4:
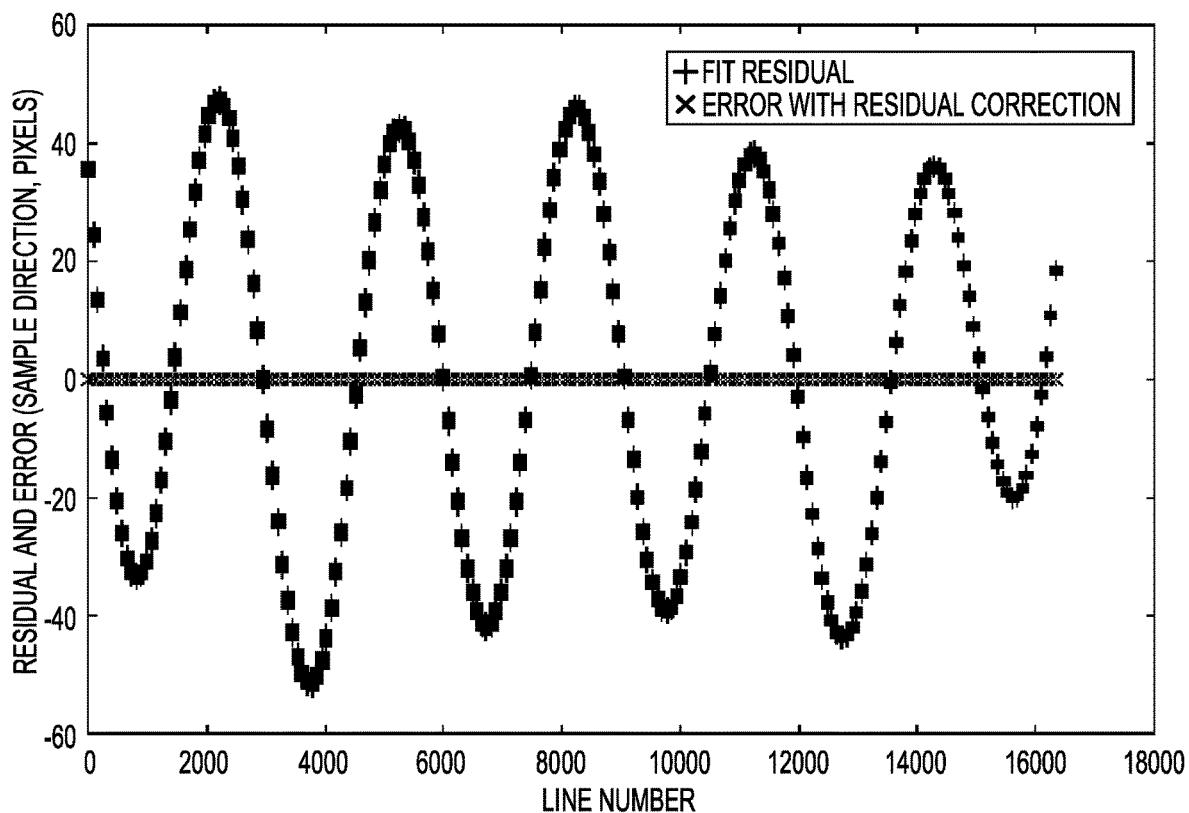
FIG. 4 is a diagram illustrating results with Newton-Raphson (NR) iteration at the fit grid points.
Figure 5:
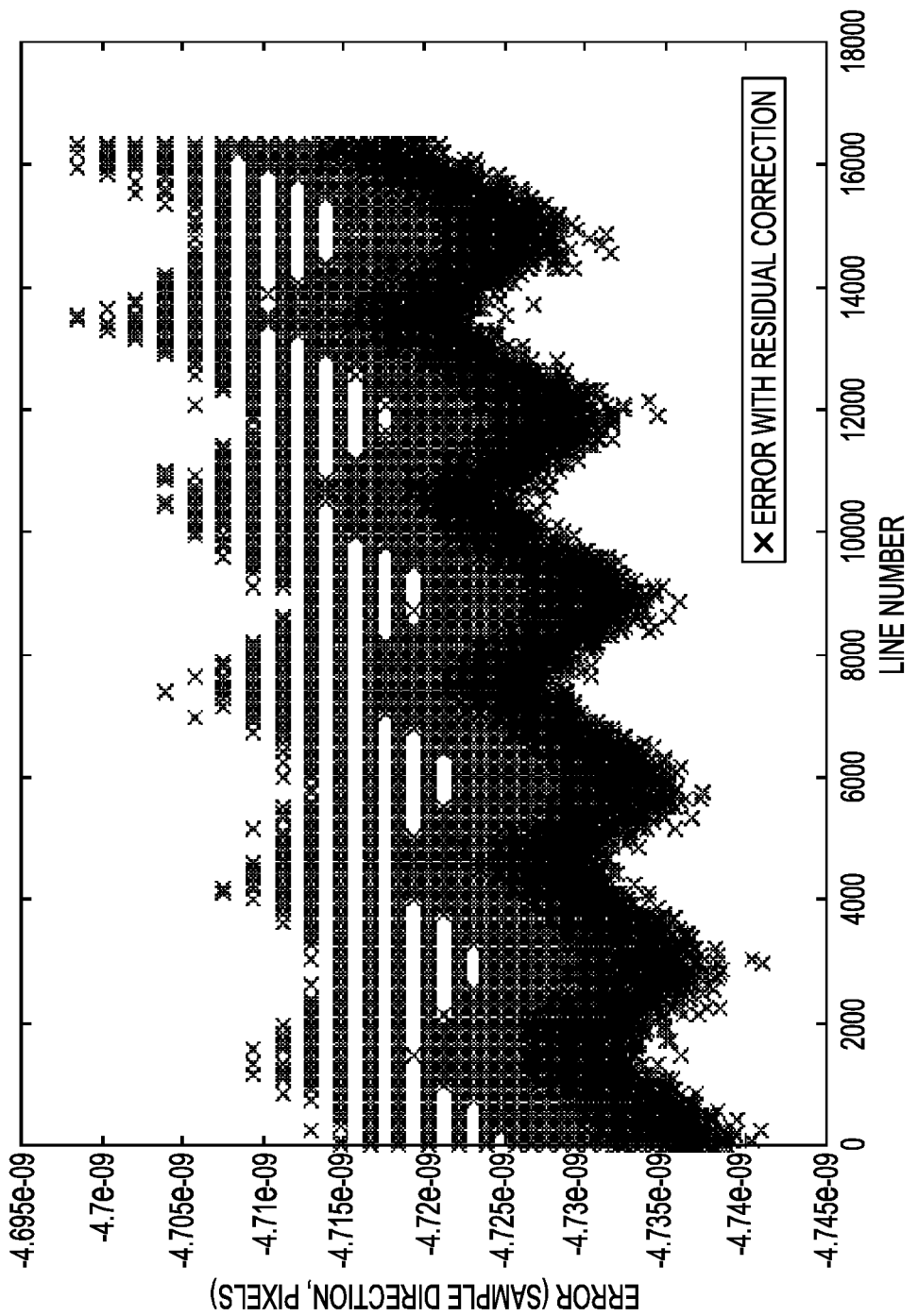
FIG. 5 is a diagram illustrating zoomed results on the error portion of FIG. 4.
Figure 6:
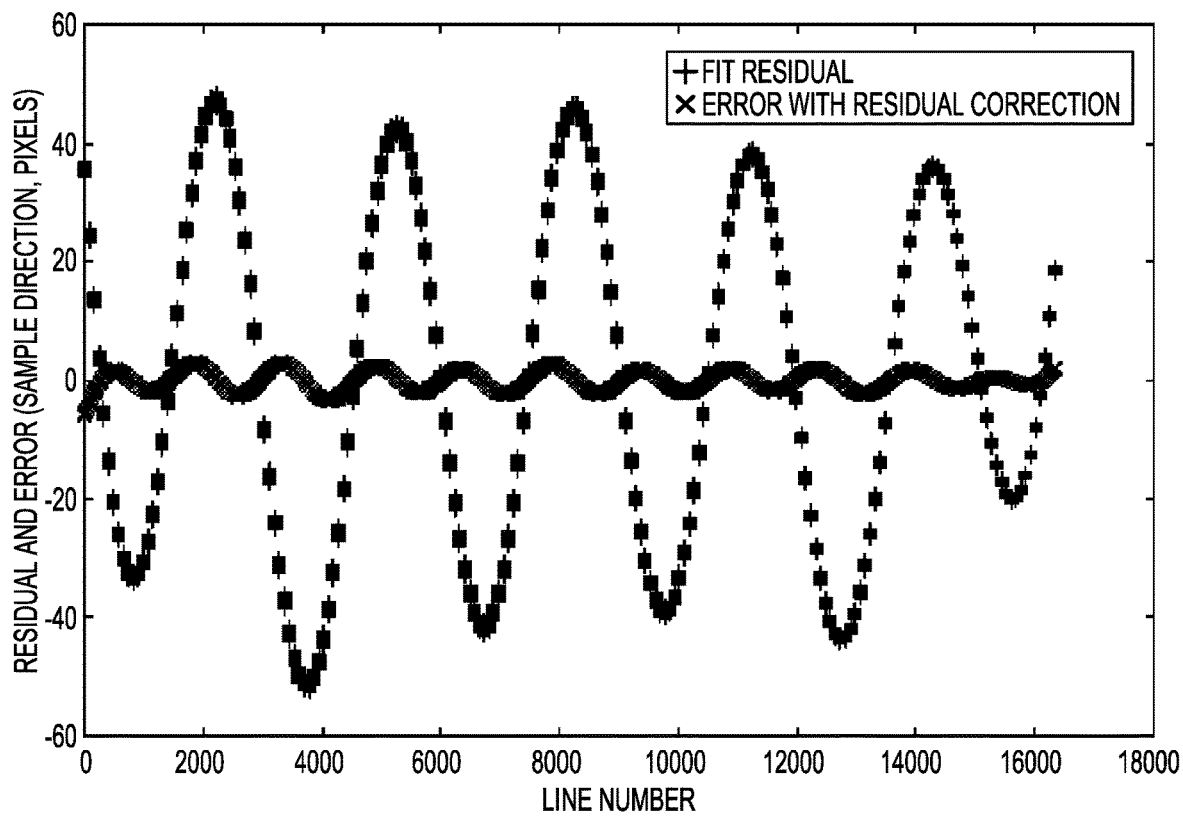
FIG. 6 is a diagram illustrating results for data evaluated between fit grid points.
Figure 7:
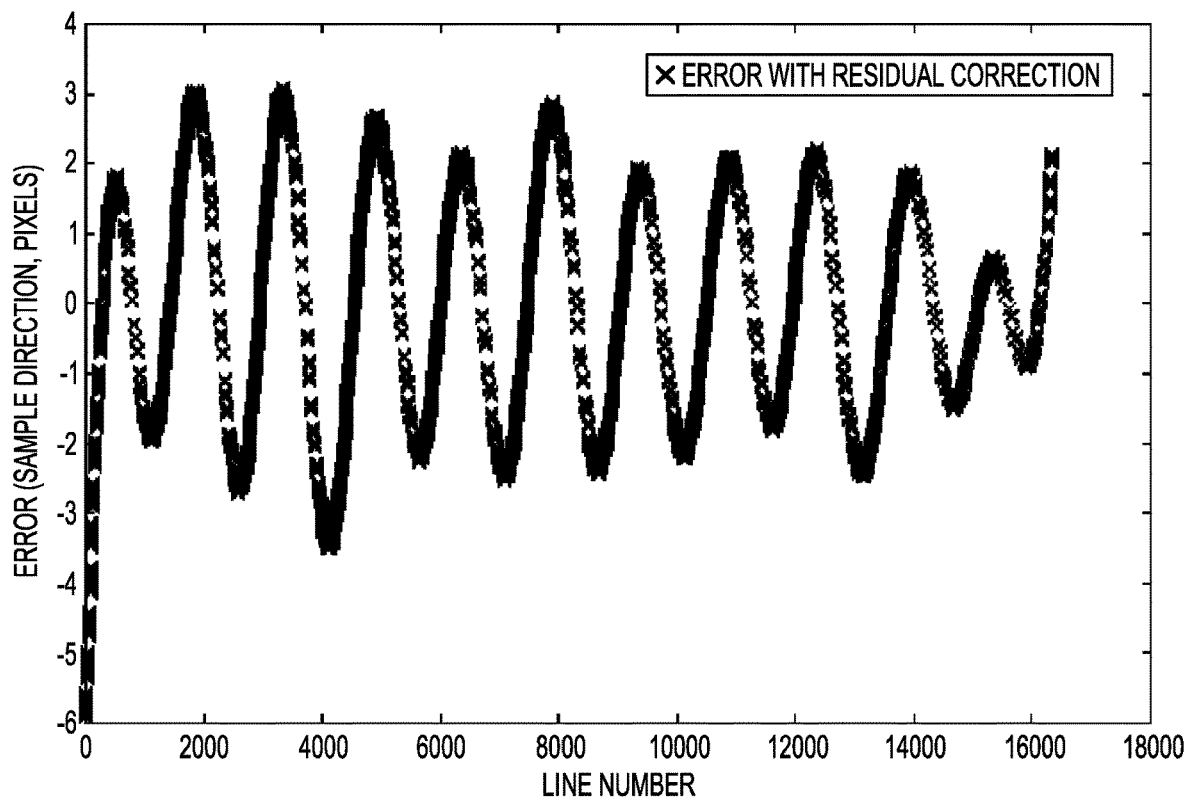
FIG. 7 is a diagram illustrating zoomed results on the error portion of FIG. 6.
Figure 8:
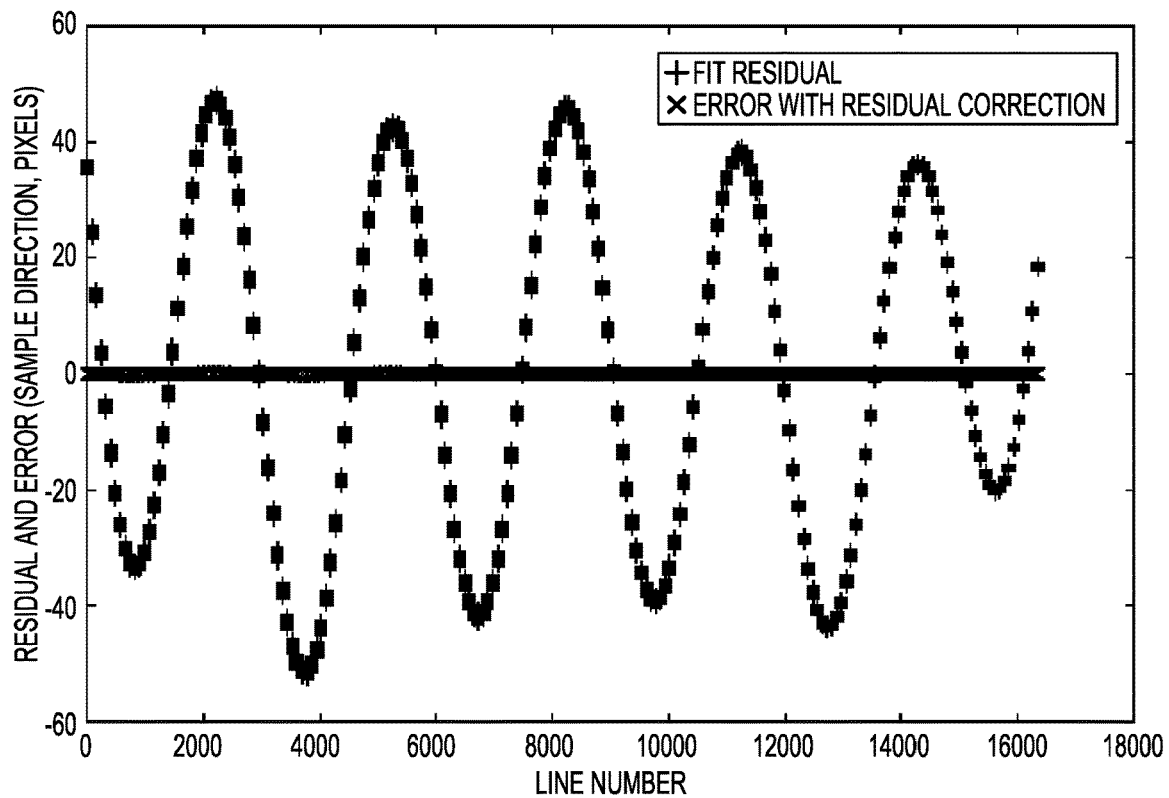
FIG. 8 is a diagram illustrating results for data evaluated between fit grid points with NR iteration.

FIGS. 4 and 5 show the results with Newton-Raphson (NR) iteration. Since the NR iteration is finding the exact root, the error shown in FIG. 5 is very small at the grid points (i.e. within the convergence tolerance of the NR method) as was shown via the formulations discussed above.

Figure 9:
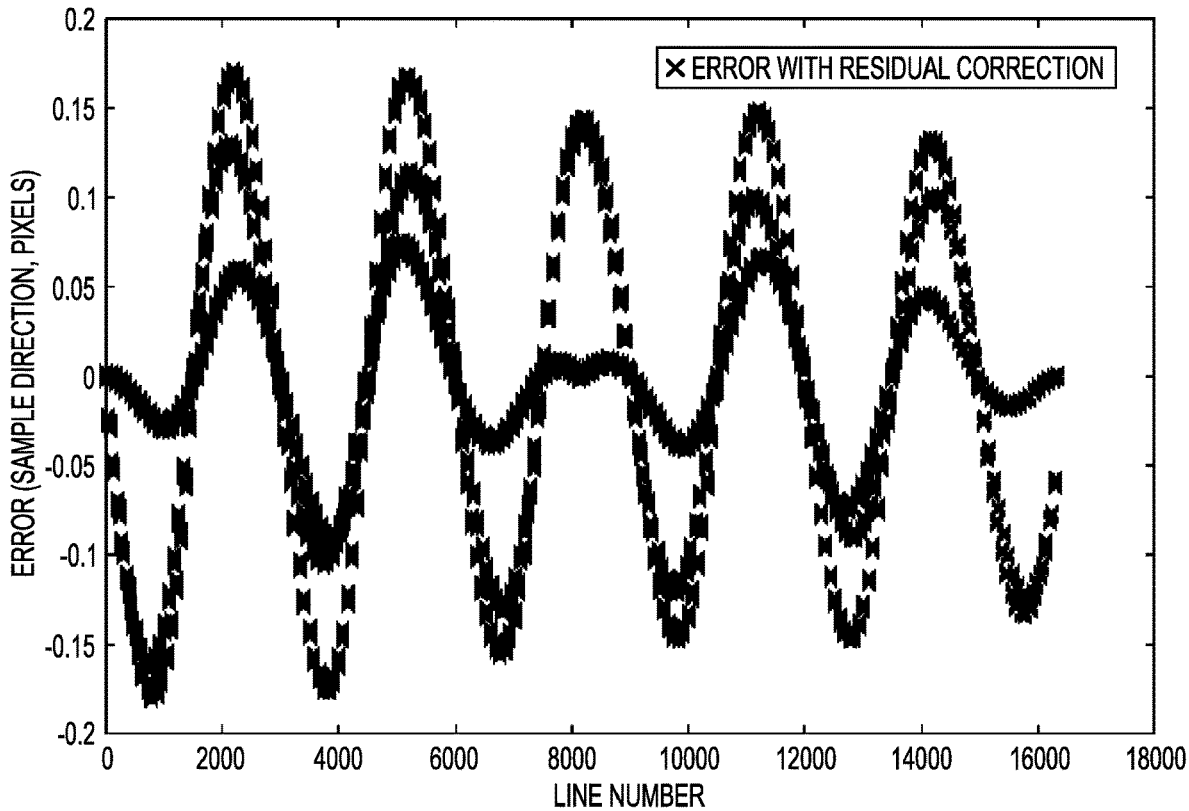
FIG. 9 is a diagram illustrating zoomed results on the error portion of FIG. 8.

FIGS. 6, 7, 8, and 9 show similar plots, but for points evaluated between the fit grid points. FIG. 9 thus shows the error in the tri-linear interpolation. With a RF fit grid spacing of 40×200×5 (numSamps×numLines×numZ), the tri-linear interpolation error is subpixel. The errors can be even further reduced by generation of an RF fit grid that is even denser (say, 80×400×5) and an evaluation grid that is similarly densified (say, 160×800×10). The trilinear interpolation error can thus be reduced to an acceptable level by simply densifying the RF-fit grid.

The following paragraphs discuss trilinear interpolation formulation and its analytical partial derivatives. As an alternative to the numerical differentiation of the residual grid L, in the following paragraphs an analytical form is derived. This will involve differentiation of the trilinear interpolation formula. Analytical partial derivatives when forming the Jacobian J is attractive for two main reasons.

1. There is no need to determine an "optimum" perturbation value Δu and Δv for the numerical derivatives; and
2. The interpolation formula will not need to be evaluated three times in computation of the Jacobian. Rather, it is replaced by a single analytical form. The computational complexity then goes down by a factor of 2.

To proceed with the analytical differentiation, the trilinear interpolation formulas are given as $$x_d = \frac{(x - x_0)}{\Delta x} \tag{27}$$

$$y_d = \frac{(y - y_0)}{\Delta y} \tag{28}$$

$$z_d = \frac{(z - z_0)}{\Delta z} \tag{29}$$

where $x_0$ represents the lattice point below X (and similarly for $y_0$ and $z_0$) and where $\Delta x$ represents the grid interval in X (and similarly for $\Delta y$ and $\Delta z$). First, an interpolation is performed along x, giving $$c_{00} = c_{000}(1-x_d) + c_{100}x_d \tag{30}$$

$$c_{01} = c_{001}(1-x_d) + c_{101}x_d \tag{31}$$

$$c_{10} = c_{010}(1-x_d) + c_{110}x_d \tag{32}$$

$$c_{11} = c_{011}(1-x_d) + c_{111}x_d \tag{33}$$

where $c_{ijk}$ represents the functional value of node point $(x_i, y_j, z_k)$. These values are then interpolated along y, giving $$c_0 = c_{00}(1-y_d) + c_{10}y_d \tag{34}$$

$$c_1 = c_{01}(1-y_d) + c_{11}y_d \tag{35}$$

Finally the above values are interpolated along z, giving $$c = c_0(1z_d) + c_1 d_z \tag{36}$$

The value C is the trilinear approximation at coordinates (x,y,z). Substituting equations (34) and (35) into (36) provides $$c = [c_{00}(1-y_d) + c_{10}y_d](1-z_d) + [c_{01}(1-y_d) + c_{11}y_d]z_d \tag{37}$$

Substituting equations (30) through (33) into equation (37) gives $$c = [\{c_{000}(1-x_d) + c_{100}x_d\}(1-y_d) + \{c_{010}(1-x_d) + c_{110}x_d\}y_d] \tag{38}$$
$$(1-z_d) + [\{c_{001}(1-x_d) + c_{101}x_d\}(1-y_d) +$$

-continued
$$\{c_{011}(1-x_d) + c_{111}x_d\}y_d]z_d =$$
$$\{c_{000}(1-x_d) + c_{100}x_d\}(1-y_d)(1-z_d) +$$
$$\{c_{010}(1-x_d) + c_{110}x_d\}y_d(1-z_d) +$$
$$\{c_{001}(1-x_d) + c_{101}x_d\}(1-y_d)z_d + \{c_{011}(1-x_d) + c_{111}x_d\}y_dz_d$$

Thus $$c = c_{000}(1-x_d)(1-y_d)(1-z_d) + \tag{39}$$
$$c_{100}x_d(1-y_d)(1-z_d) + c_{010}(1-x_d)y_d(1-z_d) +$$
$$c_{110}x_dy_d(1-z_d) + c_{001}(1-x_d)(1-y_d)z_d +$$
$$c_{101}x_d(1-y_d)z_d + c_{011}(1-x_d)y_dz_d + c_{111}x_dy_dz_d$$

To differentiate C with respect to x, y and z, one proceeds by differentiating (39) with respect to $x_d$, $y_d$ and $z_d$.

$$\frac{\partial c}{\partial x_d} = -c_{000}(1-y_d)(1-z_d) + \tag{40}$$
$$c_{100}(1-y_d)(1-z_d) - c_{010}y_d(1-z_d) + c_{110}y_d(1-z_d) -$$
$$c_{001}(1-y_d)z_d + c_{101}(1-y_d)z_d - c_{011}y_dz_d + c_{111}y_dz_d$$

$$\frac{\partial c}{\partial y_d} = -c_{000}(1-x_d)(1-z_d) - \tag{41}$$
$$c_{100}x_d(1-z_d) + c_{010}(1-x_d)(1-z_d) + c_{110}x_d(1-z_d) -$$
$$c_{001}(1-x_d)z_d - c_{101}x_dz_d + c_{011}(1-x_d)z_d + c_{111}x_dz_d$$

$$\frac{\partial c}{\partial z_d} = -c_{000}(1-x_d)(1-y_d) - c_{100}x_d(1-y_d) - \tag{42}$$
$$c_{010}(1-x_d)y_d - c_{110}x_dy_d + c_{001}(1-x_d)(1-y_d) +$$
$$c_{101}x_d(1-y_d) + c_{011}(1-x_d)y_d + c_{111}x_dy_d$$

Next, there is $$\frac{\partial x_d}{\partial x} = \frac{1}{\Delta x} \tag{43}$$

$$\frac{\partial y_d}{\partial y} = \frac{1}{\Delta y} \tag{44}$$

$$\frac{\partial z_d}{\partial z} = \frac{1}{\Delta z} \tag{45}$$

Via the chain rule, the partials can be computed as $$\frac{\partial c}{\partial x} = \frac{\partial c}{\partial x_d}\frac{\partial x_d}{\partial x} = \frac{\partial c}{\partial x_d}\frac{1}{\Delta x} \tag{46}$$

$$\frac{\partial c}{\partial y} = \frac{\partial c}{\partial y_d}\frac{\partial y_d}{\partial y} = \frac{\partial c}{\partial y_d}\frac{1}{\Delta y} \tag{47}$$

$$\frac{\partial c}{\partial z} = \frac{\partial c}{\partial z_d}\frac{\partial z_d}{\partial z} = \frac{\partial c}{\partial z_d}\frac{1}{\Delta z} \tag{48}$$

For the trilinear interpolation grid, we make the variable substitutions in the above formulas as follows:

$$(x,y,z) \leftarrow (u,v,z) \tag{49}$$

The interpolated value C (and thus its differentiation) is replaced in each (independent) interpolation with $$c \leftarrow L_u \quad (50)$$

and $$c \leftarrow L_v \quad (51)$$

The analytical partial derivatives within this section can then serve as a replacement to the numerical partial derivatives in equations (18) through (21).

Finally, note that (since z is fixed in the Jacobian computation in equation (17)) only equations (46) and (47) need to be computed once each for $L_u$, and $L_v$. That is, equation (48) is not needed in forming the analytical Jacobian in equation (17).

Figure 10:
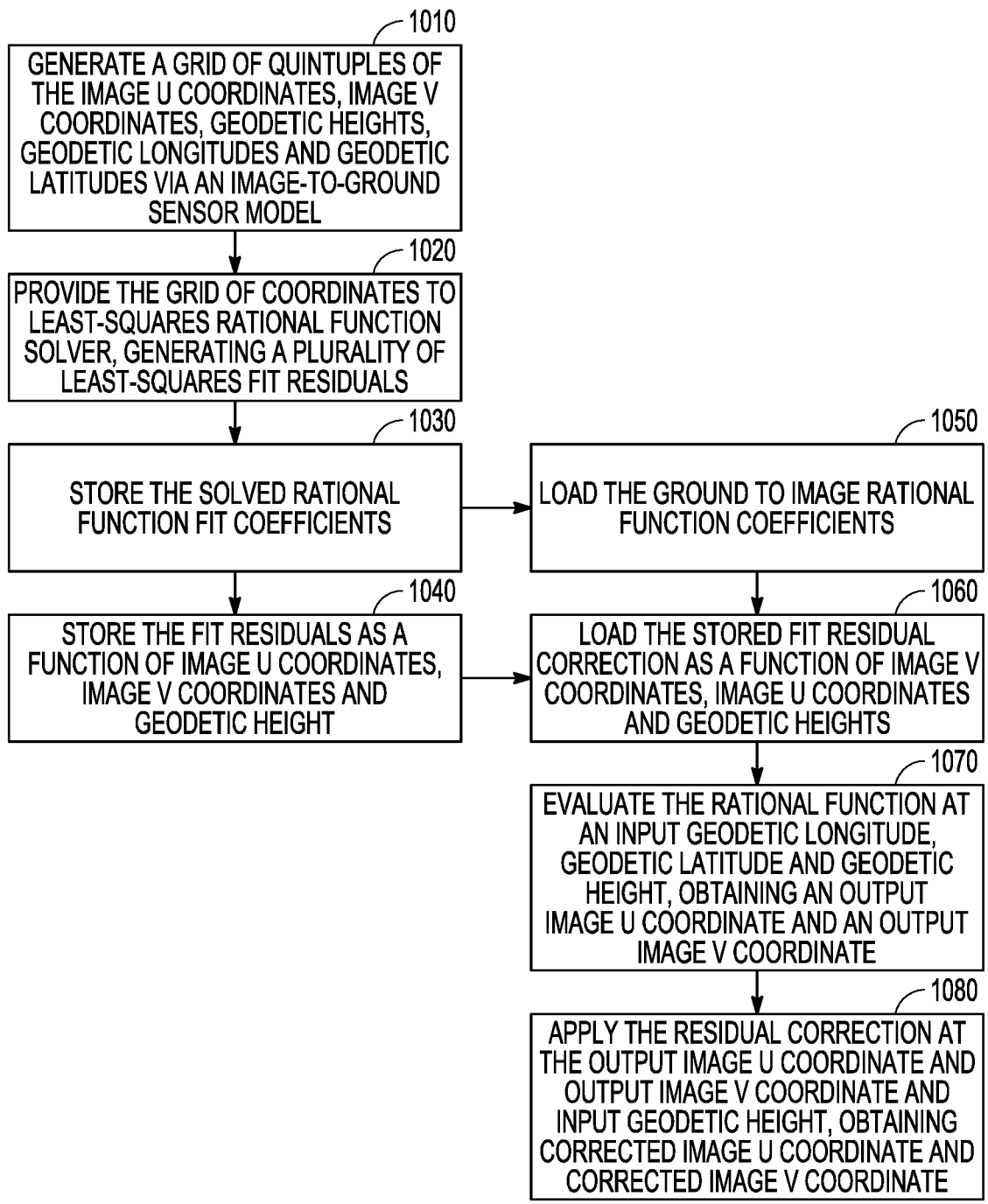
FIG. 10 contains a block diagram of operations and features of a system and process of fitting residual corrections to image rationale functions.

FIG. 10 illustrates block diagram operations and features of an example system and method for generating image rational functions via a fit residual correction, and in particular, improving accuracy in mapping geodetic coordinates to image sensor coordinates via an image rational function. FIG. 10 includes several process blocks 1010-1090. Though arranged substantially serially in the example of FIG. 10, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 10, sequences 1010 through 1040 represent the generation of the rational function coefficients and the fit residual correction. Sequences 1050 through 1090 represent application of the rational function and the fit residual correction via a downstream algorithm, thereby correcting for errors in the fit. At 1010, the grid of quintuples of image u coordinates, image v coordinates, geodetic heights, geodetic longitudes and geodetic latitudes is first generated from an original image-to-ground sensor model. At 1020, the grid is provided to a least-squares rational function solver, generating a plurality of least-squares fit residuals. An image sensor can be modeled with the corrected image rational function. At 1030 the least-squares solution for the rational function fit coefficients is stored. At 1040 the least-squares fit residuals are stored as additional metadata as a function of image u coordinates, image v coordinates and geodetic height.

At 1050, a downstream process that is to utilize the rational function and fit residual correction first loads the rational function coefficients derived from the process in step 1020 and stored at previous step 1030. At 1060, a downstream process also loads the stored fit residual correction derived from the process in step 1020 and store previously in step 1040. At 1070 the downstream process evaluates the rational function at an input geodetic longitude, input geodetic latitude and input geodetic height ("input ground coordinates"), resulting in an output image u coordinate and an output image v coordinate for the rational function evaluation. At 1080 the downstream algorithm performs trilinear interpolation of the residual correction grid as a function of image u coordinates, image v coordinates and geodetic height, obtaining a correction for u and a correction for v. At 1090, the downstream process applies the residual correction at the rational function output image u coordinate and output image v coordinate thereby providing a corrected image u coordinate and corrected image v coordinate.

Figure 11:
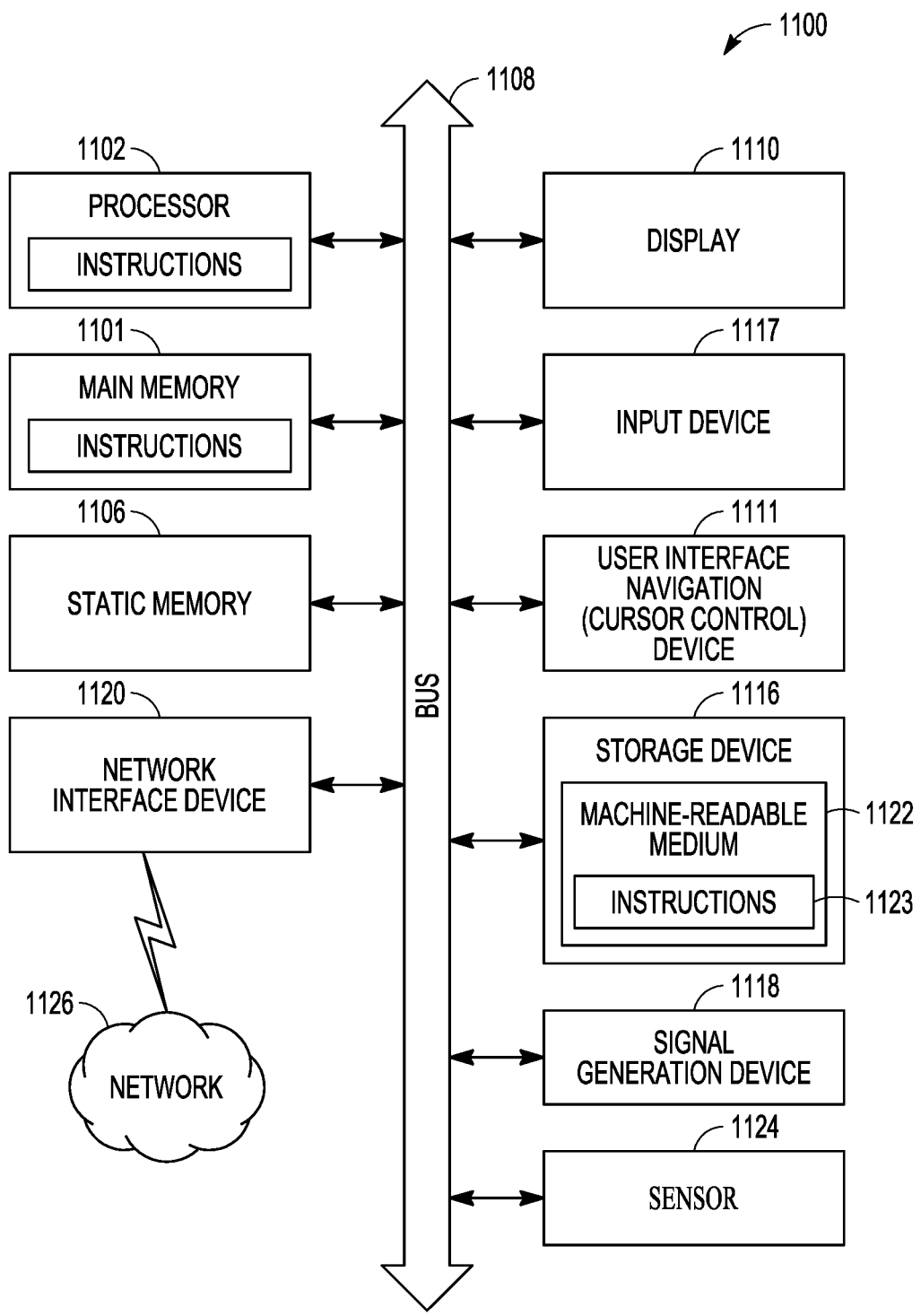
FIG. 11 is a block diagram illustrating a computer architecture upon which embodiments of the present disclosure can execute.

FIG. 11 illustrates, by way of example, a block diagram of an embodiment of a machine in the example form of a computer system 1100 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1101 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1117 (e.g., a keyboard), a user interface (UI) navigation device 1111 (e.g., a mouse), a mass storage unit 1116, a signal generation device 1118 (e.g., a speaker), a network interface device 1120, and radios such as Bluetooth, WWAN, WLAN, and NFC, permitting the application of security controls on such protocols.

The mass storage unit 1116 includes a machine-readable medium 1122 on which is stored one or more sets of instructions and data structures (e.g., software) 1123 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process for improving accuracy in mapping geodetic coordinates to image sensor coordinates via an image rational function comprising:
    fitting the image rational function to an image-to-ground sensor model at an input grid of image u coordinates and image v coordinates, and geodetic longitudes, geodetic latitudes, and geodetic heights corresponding to the image u coordinates and the image v coordinates, thereby generating a plurality of fit residuals;
    storing the plurality of fit residuals as a function of the image u coordinates, the image v coordinates, and the geodetic heights; and
    applying the plurality of fit residuals to metadata associated with the image rational function, thereby correcting for a residual error in a fit of the image rational function to the image-to-ground sensor model.

2. The process of claim 1, comprising modeling an image sensor with the corrected image rational function; wherein fitting of the image rational function comprises a least-squares fit of coefficients of the rational function to the input grid, thereby generating associated least-squares fit residuals.

3. The process of claim 2, wherein the image rational function is generated by:
    constructing a grid of quintuples comprising the image u coordinates, the image v coordinates, the geodetic heights, the geodetic longitudes and the geodetic latitudes generated from the image-to-ground sensor model;
    providing the grid of quintuples to a solver of the image rational function; and
    storing the least-squares fit residuals as a function of the image u coordinates, the image v coordinates, and the geodetic heights.

4. The process of claim 2, comprising generating the image rational function by:
    capturing the least-squares fit residuals via a least-squares fitting process;
    storing the least-squares fit residuals as a function of the image u coordinates, the image v coordinates, and the geodetic heights; and
    applying the least-squares fit residuals as a residual correction when evaluating the image rational function.

5. The process of claim 1, wherein correcting for the residual error in the fit of the image rational function comprises:
    evaluating the image rational function at a first input geodetic longitude, a first input geodetic latitude, and a first input geodetic height, thereby obtaining a first image u coordinate and a first image v coordinate;
    computing a residual correction associated with the first image u coordinate, the first image v coordinate and the first input geodetic height; and
    applying the residual correction to a corresponding image output u coordinate and a corresponding image output v coordinate.

6. The process of claim 1, wherein correcting for the residual error in the fit of the image rational function comprises building a grid of residual corrections.

7. The process of claim 1, wherein the mapping the geodetic coordinates to the image sensor coordinates via the image rational function comprises using a ratio of three-dimensional (3D) polynomials of the image rational function.

8. A non-transitory computer readable medium comprising instructions that when executed by a processor execute a process for improving accuracy in mapping geodetic coordinates to image sensor coordinates via an image rational function comprising:
    fitting the image rational function to an image-to-ground sensor model at an input grid of image u coordinates and image v coordinates, and geodetic longitudes, geodetic latitudes, and geodetic heights corresponding to the image u coordinates and the image v coordinates, thereby generating a plurality of fit residuals;
    storing the plurality of fit residuals as a function of the image u coordinates, the image v coordinates, and the geodetic heights; and
    applying the plurality of fit residuals to metadata associated with the image rational function, thereby correcting for a residual error in a fit of the image rational function to the image-to-ground sensor model.

9. The non-transitory computer readable medium of claim 8, wherein fitting of the image rational function comprises a least-squares fit of coefficients of the image-to-ground sensor model to the input grid, thereby generating associated least-squares fit residuals.

10. The non-transitory computer readable medium of claim 9, wherein the image rational function is generated by:
    constructing a grid of quintuples comprising the geodetic longitudes, the geodetic latitudes, and the geodetic heights, and the corresponding image u coordinates and image v coordinates generated from the image-to-ground sensor model;
    providing the grid of quintuples to a solver of the image rational function; and storing the least-squares fit residuals as a function of the image u coordinates, the image v coordinates, and the geodetic heights.

11. The non-transitory computer readable medium of claim 9, comprising instructions for generating the image rational function by:
capturing the least-squares fit residuals via a least-squares fitting process;
storing the least-squares fit residuals as a function of the image u coordinates, the image v coordinates, and the geodetic heights; and
applying the least-squares fit residuals as a residual correction when evaluating the image rational function.

12. The non-transitory computer readable medium of claim 8, wherein correcting for the residual error in the fit of the image rational function comprises:
evaluating the image rational function at a first input geodetic longitude, a first input geodetic latitude, and a first input geodetic height, thereby obtaining a first image u coordinate and a first image v coordinate;
computing a residual correction associated with the first input geodetic longitude, the first input geodetic latitude, and the first input geodetic height; and
applying the residual correction to a corresponding image output u coordinate and a corresponding image output v coordinate.

13. The non-transitory computer readable medium of claim 8, wherein correcting for the residual error in the fit of the image rational function comprises building a grid of residual corrections.

14. The non-transitory computer readable medium of claim 8, wherein the mapping the geodetic coordinates to the image sensor coordinates via the image rational function comprises instructions for using a ratio of three-dimensional (3D) polynomials of the image rational function.

15. A system comprising:
a computer processor; and
a memory coupled to the computer processor;
wherein the computer processor is operable for executing a process for improving accuracy in mapping geodetic coordinates to image sensor coordinates via an image rational function, the process comprising:
fitting the image rational function to an image-to-ground sensor model at an input grid of image u coordinates and image v coordinates, and geodetic longitudes, geodetic latitudes, and geodetic heights corresponding to the image u coordinates and the image v coordinates, thereby generating a plurality of fit residuals;
storing the plurality of fit residuals as a function of the image u coordinates, the image v coordinates, and the geodetic heights; and
applying the plurality of fit residuals to metadata associated with the image rational function, thereby correcting for a residual error in a fit of the image rational function to the image-to-ground sensor model.

16. The system of claim 15, wherein fitting of the image rational function comprises a least-squares fit of coefficients of the image-to-ground sensor model to the input grid, thereby generating associated least-squares fit residuals.

17. The system of claim 16, wherein the image rational function is generated by:
constructing a grid of quintuples comprising the image u coordinates, the image v coordinates, the geodetic longitudes, the geodetic latitudes, and the geodetic heights generated from the image-to-ground sensor model;
providing the grid of quintuples to a solver of the image rational function; and
storing the least-squares fit residuals as a function of the image u coordinates, the image v coordinates, and the geodetic heights.

18. The system of claim 16, comprising generating the image rational function by:
capturing the least-squares fit residuals via a least-squares fitting process;
storing the least-squares fit residuals as a function of the image u coordinates, the image v coordinates, and the geodetic heights; and
applying the least-squares fit residuals as a residual correction when evaluating the image rational function.

19. The system of claim 15, wherein correcting for the residual error in the fit of the image rational function comprises:
evaluating the image rational function at a first input geodetic longitude, a first input geodetic latitude, and a first input geodetic height;
computing a residual correction associated with the first input geodetic longitude, the first input geodetic latitude, and the first input geodetic height; and
applying the residual correction to a corresponding image output u coordinate and a corresponding image output v coordinate.

20. The system of claim 15, wherein correcting for the residual error in the fit of the image rational function comprises building a grid of residual corrections; and wherein the mapping the geodetic coordinates to the image sensor coordinates via the image rational function comprises using a ratio of three-dimensional (3D) polynomials of the image rational function.

* * * * *